United States Patent [19]

Uzuka

[11] 4,385,265
[45] May 24, 1983

[54] DRIVE CIRCUIT FOR BRUSHLESS DC MOTOR

[75] Inventor: Mitsuo Uzuka, Urawa, Japan

[73] Assignee: Sony Corporation, Tokyo, Japan

[21] Appl. No.: 239,604

[22] Filed: Mar. 2, 1981

[30] Foreign Application Priority Data

Feb. 29, 1980 [JP] Japan .................................. 55-25804

[51] Int. Cl.³ ............................................ H02K 29/00
[52] U.S. Cl. ..................................... 318/138; 318/254
[58] Field of Search ........................... 318/254 A, 138;
307/263–265, 268, 546, 547, 549, 551; 330/284

[56] References Cited

U.S. PATENT DOCUMENTS 4,114,073 9/1978 Uzuka .................................. 318/138
4,217,508 8/1980 Uzuka .................................. 310/46

OTHER PUBLICATIONS

Mottershead, A., Electronic Devices and Circuits, Goodyear Publishing Co. 1973, pp. 274–275.

Primary Examiner—J. V. Truhe
Assistant Examiner—Saul M. Bergmann
Attorney, Agent, or Firm—Lewis H. Eslinger; Alvin Sinderbrand

[57] ABSTRACT

A drive circuit for a brushless DC motor assures that the stator coils of the motor do not generate unwanted electromagnetic noise, but does not sacrifice efficiency of the motor. The drive circuit can include an input circuit to which a rectangular switching signal is applied, a circuit including a drive transistor providing stator drive current in response to the input switching signal, and an RC smoothing circuit to impart sloping leading and trailing edges to the drive current so that the drive current assumes a somewhat sinusoidal shape and the electromagnetic noise is avoided. In order to prevent the motor efficiency from dropping under low-torque and high-speed conditions, the delay times for the leading and trailing edges are controlled to increase or decrease in dependence upon the load to the motor. In one embodiment, the collector-emitter voltage of the drive transistor is sensed and this voltage is furnished to a control transistor so that the latter adjusts the level of the input switching signal according to the sensed voltage level. Preferably, the base current applied to the drive transistor is kept near the saturation level.

11 Claims, 5 Drawing Figures

DRIVE CIRCUIT FOR BRUSHLESS DC MOTOR

BACKGROUND OF THE INVENTION

1. Field of the Invention

This invention relates to a drive circuit for a brushless DC motor, and more particularly to such a drive circuit in which objectionable audible sound generated in a stator coil of the motor is substantially reduced.

2. Description of the Prior Art

In a switching type brushless DC motor, transistors are conventionally coupled to armature coils mounted on the stator of the motor. Rectangular drive signals are applied to these transistors to switch them over so that they alternately supply current to the armature coils. Since the drive signal is a rectangular wave, it includes a significant proportion of high frequency components. When these high frequency components reach the armature coil, the latter acts like the voice coil of a speaker, and an objectionable electromagnetic noise appears, usually as an audible hum. This electromagnetic noise can be bothersome, particularly when the load to the brushless DC motor is large. In such circumstances, the current flowing through the armature coil is large, and the electromagnetic sound from the armature coil becomes loud and distracting.

One conventional technique to reduce the electromagnetic sound involves applying an approximately sinusoidal wave as the drive signal. When a sinusoidal wave is so used, current should be supplied to the armature coil both on the positive side of the sinusoidal wave and also on the negative side thereof. Accordingly, two drive transistors are required for each armature coil, and positive and negative power sources are required to generate the sinusoidal wave drive signal. Consequently with such a technique the number of circuit elements required is disadvantageously large, and motor efficiency is low.

In another technique, the rectangular drive signal is smoothed in an RC circuit, i.e., a filter circuit including a time constant circuit formed of a capacitor and a resistor. In this technique, a rectangular wave is smoothed or dulled in the RC filter circuit so that the drive signal is correspondingly smoothed. The rising time of the drive signal is delayed by a time $t_1$, and its falling time is delayed by a time $t_2$ from the corresponding switching times of the rectangular wave, and this delay decreases motor efficiency. In particular, when the rotational speed of the motor is high, that is, when the width of the rectangular wave is small, the ratio of the delay times $t_1$ and $t_2$ to the width of the rectangular wave becomes large. Although the delay times can be decreased by lowering the RC time constant of the filter circuit to promote efficiency, the electromagnetic sound from the armature coil becomes louder as the RC time constant decreases. Accordingly, the time constant of the filter circuit is conventionally selected to be large enough that inefficiency results at high speeds.

OBJECTS AND SUMMARY OF THE INVENTION

Accordingly, it is an object of this invention to provide a drive circuit for a brushless DC motor which overcomes the above-described defects of prior art drive circuits.

More particularly, it is an object of this invention to provide such a drive circuit which reduces electromagnetic noise generated by the motor without sacrificing the motor's efficiency.

In accordance with an aspect of this invention, a drive circuit for a brushless DC motor comprises an input circuit to which a rectangular switching signal is applied, a circuit, preferably including a drive transistor, providing stator drive current to an armature coil of the motor in response to the input switching signal, a smoothing circuit to impart sloping leading and trailing edges to the drive current so that the drive current assumes a somewhat sinusoidal waveform to minimize electromagnetic noise, and a control circuit to control the delay times for the leading and trailing edges of the drive current in dependence upon the load to the motor. According to an embodiment of this invention, the control circuit senses the collector voltage of the drive transistor and in response controls the level of the switching signal in the smoothing circuit so that the base current applied to the drive transistor is maintained at a level substantially corresponding to the drive transistor's saturation level.

The foregoing and other objects, features, and advantages of the present invention will be more fully understood from the following detailed description of several preferred embodiments of this invention, which should be read in conjunction with the accompanying drawings.

DETAILED DESCRIPTION OF THE PREFERRED EMBODIMENTS

Figures 1A, 1B:
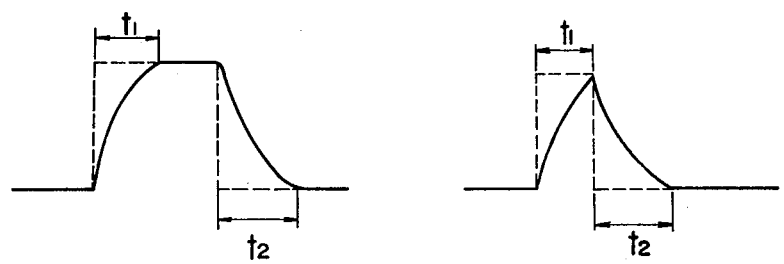
FIG. 1A and FIG. 1B are waveform diagrams for explaining a known method of reducing electromagnetic sound produced by the armature coil of a brushless DC motor.

It is known in the prior art to shape a rectangular drive signal, as shown in the dashed line in FIGS. 1A and 1B, by delaying the rising and falling edges thereof. This smoothed drive signal, as shown in the solid lines in these views, is then applied as drive current to the stator coils of a DC brushless motor.

In particular, to avoid unwanted electromagnetic sound from being produced in the stator coils of the motor, the rectangular wave as shown in FIG. 1A is smoothed or dulled in an RC filter circuit to remove the higher frequency components and thus to approximate a sinusoidal drive current. The switching time of the drive signal is delayed by a first time $t_1$ at its rising edge and by a second time $t_2$ at its falling edge from the corresponding switching times of the rectangular wave. While the resulting drive signal (FIG. 1A) can result in reduced electromagnetic noise, the delay times $t_1$ and $t_2$ also serve to decrease the motor efficiency. Thus, when the rotational speed of the motor is high, and the width of the rectangular wave is small (FIG. 1B), the ratio of the delay times $t_1$ and $t_2$ to the width of the rectangular wave becomes rather large. This results in inefficient motor operation at high speeds, and in consequence, can also result in waste of energy as well as overheating of and damage to the drive circuit.

If, instead, the delay times $t_1$ and $t_2$ are selected to be small enough to permit efficient operation during high-speed and low-load conditions, the lower time constants $t_1$ and $t_2$ will not prevent electromagnetic noise during high-load and low-speed conditions.

In contrast to the above, the present invention suppresses the electromagnetic noise without sacrificing the efficiency of the motor under low-load or high-speed conditions.

Before showing specific examples of the drive circuit according to this invention, the principle behind this invention will be briefly explained with reference to FIG. 2 and FIG. 3.

In this invention, a rectangular wave is dulled or smoothed, for example, by means of an RC (Resistor-Capacitor) timing circuit, in which, unlike conventional techniques, the rising time $t_1$ and the falling time $t_2$ are controlled in accordance with the level of armature current flowing through the armature or stator coil. In other words, the driving current to the armature coils is provided with sloping leading and trailing edges whose rising and falling times, respectively, are controlled in accordance with the load to the motor.

Here, the terms, "rising time" and "falling time" refer to the actual times required for the driving current to rise from a minimum value to a maximum value thereof, and to fall therefrom, respectively. These rising and falling times are changed, for example, by a switching technique; thus, the changing of the rising times and falling times does not required any change in the RC time constant, and is not dependent upon any inherent frequency response of the motor.

Figure 2:
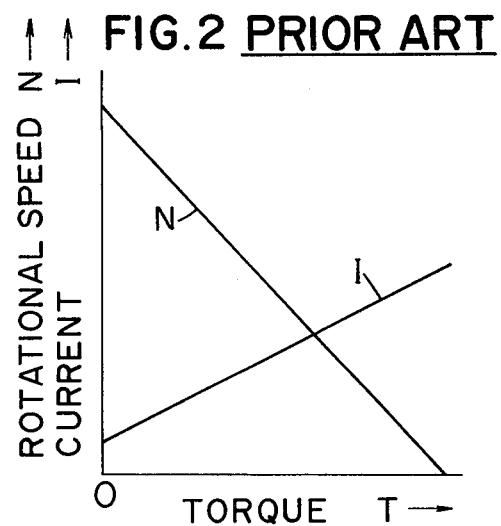
FIG. 2 is a graph showing torque characteristics of a brushless DC motor.

Generally, the relationship among rotational torque T, rotational speed N, and armature current I is shown in FIG. 2. The current I increases with the load on the motor, and the rotational speed N drops with the increase of the load. Therefore, the rotational speed N decreases with increases of the current I. In the brushless DC motor, the current I is inversely proportional to the speed N, and is thus likewise inversely proportional to a drive frequency (switching changeover frequency) f, where the drive voltage is held constant. The level of the electromagnetic sound produced by the stator coil is proportional to the current I, and is thus inversely proportional to the speed N, and thus also to the changeover frequency f of the current I.

This invention takes advantage of the foregoing facts so that the driving current to the stator coil has leading and trailing edges with variable delay times.

Figure 3:
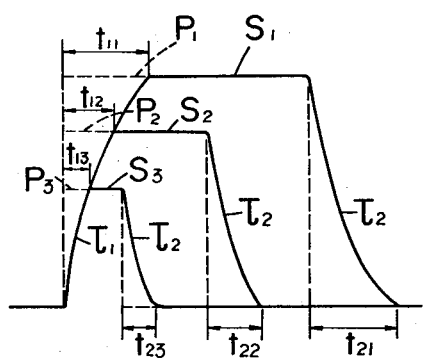
FIG. 3 is a waveform diagram for explaining the principle of this invention.

As shown in FIG. 3, the rising edge of a rectangular wave $P_1$ is integrated with a time constant $\tau_1$, and the trailing edge thereof is integrated with another time constant $\tau_2$ to obtain a drive wave $S_1$.

The width of the rectangular wave $P_1$ is narrowed with any decrease of the motor load, and therefore with the rise of the rotational speed N or f, and the level of the rectangular wave $P_1$ is lowered therewith, as shown for example by waves $P_2$, $P_3$, .... The rectangular waves $P_1$, $P_2$, $P_3$ ... are integrated at their rising edges and falling edges with the same time constants $\tau_1$ and $\tau_2$ so as to obtain drive waves $S_1$, $S_2$, $S_3$, ..., respectively. The rising times of the drive waves $S_1$, $S_2$, $S_3$, ... and the falling times thereof are shortened with any decrease of the widths of the rectangular waves $P_1$, $P_2$, $P_3$, ..., as shown by rising times $t_{11} > t_{12} > t_{13}$ ..., and falling times $t_{21} > t_{22} > t_{23}$ ....

When the motor is started, or when the load on the motor is large, the rotational speed N is low, and, therefore, the armature current I is large enough so that significant electromagnetic sound can be generated. However, since the rising time and the falling time of the current I are relatively lengthened as shown by $t_{11}$ and $t_{21}$, the audible level of the electromagnetic sound is significantly lowered. In other words, the switching time of the drive wave $S_1$ is lengthened in comparison with the rectangular wave $P_1$, but the ratio of the delay time to the width of the rectangular wave is not increased. Accordingly, the motor efficiency is not degraded on account of the delay time.

When the load on the motor is small, or when the rotational speed N is high, the current I is small, and therefore the level of the electromagnetic sound is low. In these circumstances, the rising time and the falling time can be shortened, as shown by times $t_{13}$ and $t_{23}$. Accordingly, the motor efficiency can be increased.

Thus, the time constants $\tau_1$ and $\tau_2$ can be selected to be sufficiently large to minimize electromagnetic sound, but the motor can still be driven efficiently, regardless of the load on the motor.

Now there will be described several embodiments of the drive circuit according to this invention for carrying out the shaping of the stator drive current as described above.

Figure 4:
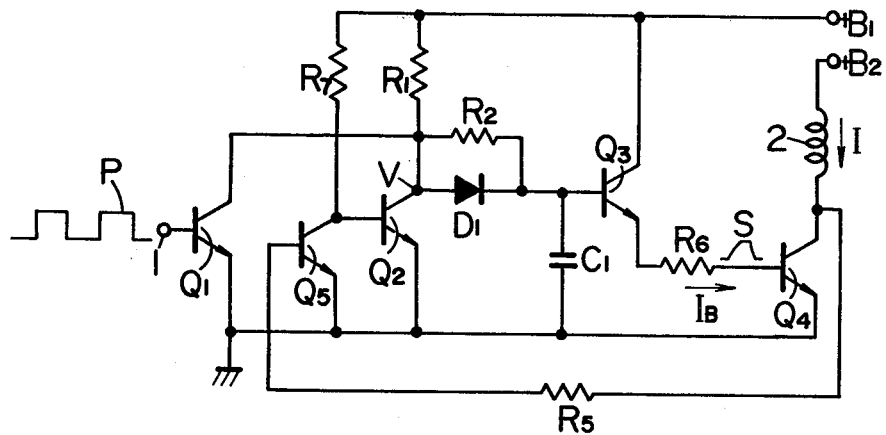
FIG. 4 is a circuit diagram of a drive circuit of a brushless DC motor according to one embodiment of this invention.

FIG. 4 shows a first embodiment of this invention in which an input terminal 1 receives a rectangular input signal P. This input signal P is applied to the base of an input transistor $Q_1$ whose emitter is grounded and whose collector is coupled through a collector resistor $R_1$ to a first voltage supply $+B_1$. A second transistor $Q_2$ is connected with its collector and emitter in parallel to those of the input transistor $Q_1$. A resistor $R_2$ is coupled from the joined collectors of the transistors $Q_1$ and $Q_2$ to the base of an output transistor $Q_3$, and a diode $D_1$ is coupled in parallel with the resistor $R_2$. A timing capacitor $C_1$ is connected between the base of the transistor $Q_3$ and ground.

The output transistor $Q_3$ is arranged as an emitter follower. Its emitter applies a drive current $I_B$ through an emitter resistor $R_6$ to a drive transistor $Q_4$. A collector load 2, which here is one of the stator coils of a motor, is connected between the collector of the drive transistor $Q_4$ and a second voltage supply $+B_2$.

The circuit of FIG. 4 further includes a control feedback loop to control the driving current I of the drive transistor $Q_4$. In this control circuit, the collector of the drive transistor $Q_4$ is coupled through a resistor $R_5$ to the base of a transistor $Q_5$ whose collector is coupled through a collector resistor $R_7$ to the voltage supply $+B_1$ and is also coupled to the base of the transistor $Q_2$. As will be apparent from the discussion to follow, the transistor $Q_5$ acts as a measuring transistor to measure the collector-emitter voltage of the drive transistor $Q_4$ and in response to adjust the voltage at the collector of the transistor $Q_2$.

In operation, the leading edge of the rectangular waveform from the signal P is integrated in one time constant circuit formed by the capacitor $C_1$ and the resistor $R_1$ so that the leading edge of the rectangular signal P rises with a time constant $\tau_1 = R_1 C_1$. Conversely, the trailing edge of the rectangular waveform signal P is integrated through another time constant circuit formed by the capacitor $C_1$ and the resistor $R_2$ and thus decays with another time constant $\tau_2 = R_2C_1$. The signal thus integrated is applied as a drive signal S to the transistor $Q_4$, and the drive current I is provided with the desired waveform corresponding to that of the drive signal S.

The feedback circuit $R_5$, $Q_5$, $R_7$ acts to control the base current $I_B$ of the transistor $Q_4$ so that its collector-emitter voltage $V_{CE}$ is substantially equal to its base-emitter voltage $V_{BE}$ when the transistor $Q_4$ is in its saturation region. To effect this control the collector-emitter voltage $V_{CE}$ is detected and supplied to the base of the transistor $Q_5$. When the current I increases, the voltage $V_{CE}$ also increases and, therefore, the base current to the transistor $Q_5$ increases. Accordingly, the transistor $Q_2$ provides a collector voltage V that increases to raise the level of the drive signal S, and therefore to also increase the base current $I_B$ applied to the transistor $Q_4$.

In the circuit of FIG. 4, the rising time and the falling time of the drive signal S are lengthened to reduce the incidence of electromagnetic sound in the coil 2 whenever the current I is high. Conversely, whenever the current I decreases, the circuit of FIG. 4 acts to lower the level of the drive signal S and to shorten the rising and falling times thereof, thereby preventing the efficiency of the motor from being reduced.

Thus, in the embodiment of this invention as described above, the collector voltage V of the transistor $Q_2$ rises and falls in proportion to the driving current I so that the driving current I applied to the stator coil 2 achieves the desired waveform as shown in FIG. 3.

In this embodiment, the diode $D_1$ serves to intercept the discharge current from the capacitor $C_1$. It is noted that the resistor $R_2$ may alternately be connected in parallel with the capacitor $C_1$.

Figure 5:
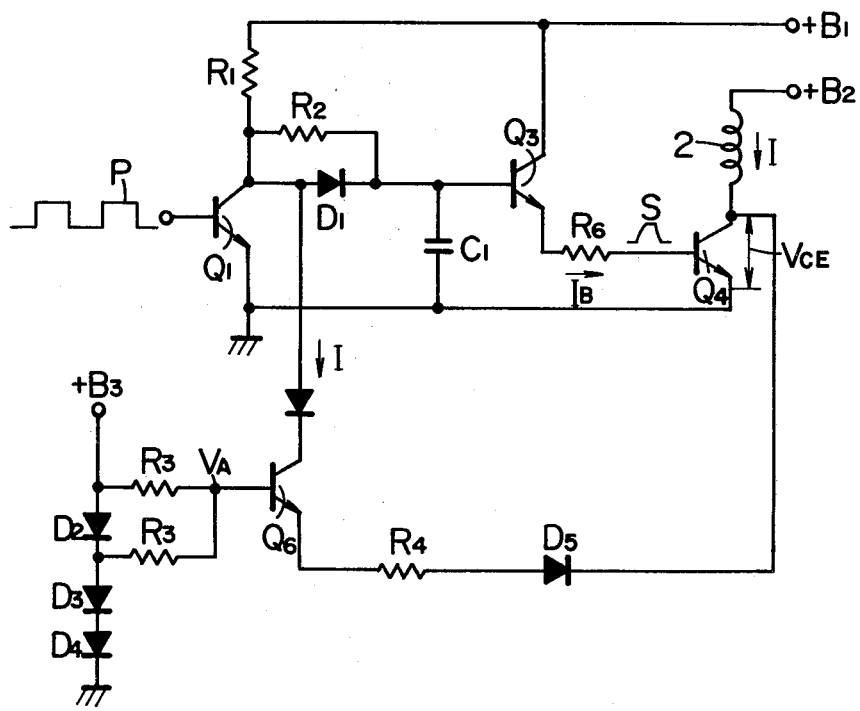
FIG. 5 is a circuit diagram of a drive circuit of a brushless DC motor according to another embodiment of this invention.

FIG. 5 shows a second embodiment of this invention, in which elements in common with the embodiment of FIG. 4 are identified with the same reference characters, and a detailed description thereof is omitted.

In the embodiment of FIG. 5, the transistor $Q_2$ is omitted, and the resistor $R_2$ and the diode $D_1$ extend from the collector of the transistor $Q_1$ alone to the base of the transistor $Q_3$. Here, the control circuit is formed of a diode $D_5$ having its cathode connected to measure the collector-emitter voltage $V_{CE}$ at the collector of the transistor $Q_4$, and having its anode connected through a resistor $R_4$ to the emitter of a transistor $Q_6$. This transistor $Q_6$ is arranged in common-base configuration with its collector connected to the collector of the transistor $Q_1$ and with its base biased to a reference voltage $V_A$. A biasing arrangement is formed of diodes $D_2$, $D_3$, and $D_4$ connected in series between a third voltage supply $+B_3$ and ground, and a pair of like-valued resistors $R_3$, $R_3$ bridging the diode $D_2$ provide at their junction the voltage $V_A$.

The anode-cathode voltages of the diodes $D_2$, $D_3$, $D_4$, and $D_5$ are selected to be nearly equal to the base-emitter voltage $V_{BE}$ of the transistor $Q_6$. Accordingly, the reference voltage $V_A$ applied to the base of the transistor $Q_6$ has a value $V_A = 2.5 V_{BE}$.

Here, the reference voltage $V_A$ can be expressed by the following relationship:

$$V_A = V_{BE} + I_1R_4 + V_{BE} + V_{CE},$$

where $I_1$ represents the current flowing through the transistor $Q_6$, $V_{BE}$ represents the base-emitter voltage of the transistor $Q_6$ and also represents the anode-cathode voltage drop of the diode $D_5$, and $V_{CE}$ represents the collector-emitter voltage of the transistor $Q_4$. The resistance of the resistor $R_4$ is low, as is the current $I_1$, so that the term $I_1R_4$ can be neglected. Thus, this relationship can be expressed:

$$V_A \approx 2V_{BE} + V_{CE}$$

Accordingly, the collector-emitter voltage $V_{CE}$ is kept nearly equal to 0.5 $V_{BE}$ or half the base-emitter voltage.

The collector-emitter voltage $V_{CE}$ of the transistor $Q_4$ is thus maintained substantially at its saturation level. In that condition, the current $I_1$ decreases with any increase in the drive current I to raise the level of the base current $I_B$ to the transistor $Q_4$. Thus, in this embodiment, the rising time and the falling time of the drive signal S are lengthened when the drive current I is high, so that electromagnetic sound in the coil 2 is suppressed. However, when the motor load is small and, therefore, the drive current I decreases, the circuit $D_5$, $R_4$, $Q_6$ acts to decrease the base current $I_B$. Thus, when the driving current I is small, the rising time and the falling time of the drive signal S are shortened, and the efficiency of the motor is prevented from dropping.

For reasons of simplicity, the embodiments of FIGS. 4 and 5 show the drive circuit for only one stator coil 2 of a brushless DC motor. However in a practical motor several stator coils 2 are provided and a plurality of such drive circuits would ordinarily be provided.

It is also to be understood that rotational position detection elements, such as Hall elements, reed switches, or the like, would be included to provide the rectangular signals P. Furthermore, in a polyphase DC brushless motor, several such position detection elements would be included to assure that the rectangular signals P are supplied to the input terminals 1 of the respective drive circuits to energize the stator coils 2 in their proper sequence. However, such elements are well known, and are omitted here for reasons of simplicity.

In summary, with the above embodiments of this invention, the rising time and falling time of current flowing through the stator coils of a DC brushless motor are controlled in accordance with the load on the motor. When the drive current is large, such as on start up of the motor or when the load on the motor is large, the rising time and the falling time are lengthened in order to suppress electromagnetic sound. However, because the rotational speed of the motor is low when the drive current is high, the motor efficiency is not significantly reduced by prolonging the rising and falling time of the drive current. Further, when the load on the motor is small, and therefore the drive current is also small, any electromagnetic sound generated by the stator coil would also be small. Thus, the rising and falling times are shortened so as to prevent the efficiency of the motor from being lowered.

Although illustrative embodiments of this invention have been described in detail herein with reference to the accompanying drawings, it is to be understood that this invention is not limited to those precise embodiments, and that various changes and modifications could be effected therein by one skilled in the art without departing from the scope and spirit of the present invention as defined in the appended claims.

What is claimed is:
1. In a drive circuit for a brushless DC motor having at least one armature coil and to which a load is applied, comprising input means for receiving an input switch- ing signal, driving means for applying a driving current to said armature coil in response to said switching signal, and smoothing means for imparting to the driving current sloping leading and trailing edges having finite rising and falling times, respectively; the improvement wherein said smoothing means includes controlling means to control said rising time and said falling time in accordance with the load on said motor.

2. A drive circuit according to claim 1, wherein said driving means includes a drive transistor having first and second current-carrying electrodes coupled in series with said armature coil, and a control electrode; said smoothing means provides a smoothed driving signal to said control electrode and includes time constant circuit means having an input coupled to said input means, a predetermined rising time constant associated with said leading edge, and a predetermined falling time constant associated with said trailing edge; and said controlling means includes measuring means for measuring the voltage across the first and second current-carrying electrodes of said drive transistor, and adjusting means for adjusting the level of said input switching signal applied to said time constant circuit means in accordance with the measured voltage across said first and second current-carrying electrodes.

3. A drive circuit according to claim 2, wherein said time constant circuit means includes a first integrating circuit for integrating the leading edge of said switching signal and a second integrating circuit for integrating the trailing edge of said switching signal.

4. A drive circuit according to claim 3, wherein said first integrating circuit includes a capacitor and a first resistor and said second integrating circuit includes said capacitor and a second resistor.

5. A drive circuit according to claim 4, wherein said first resistor and said second resistor are coupled in series between said capacitor and a point of reference voltage, and said time constant circuit means further includes a diode coupled in parallel with said second resistor.

6. A drive circuit according to claim 4, wherein said first resistor is connected between a point of reference voltage and said input of the time constant circuit means, said second resistor is connected between said input and said capacitor, and a diode is coupled in parallel with said second resistor.

7. A drive circuit according to claim 2, wherein said measuring means includes a measuring transistor having an output electrode and an input electrode coupled to said first current-carrying electrode of said drive transistor, and said adjusting means includes an adjusting transistor having a control electrode coupled to the output electrode of said measuring transistor and an output electrode coupled to said time constant circuit means to furnish thereto a control voltage that increases with increasing values of the measured voltage across said first and second current-carrying electrodes.

8. A drive circuit according to claim 2, wherein said measuring means includes a measuring diode having first and second electrodes, the first electrode thereof being coupled to said first current-carrying electrode of said drive transistor; and said adjusting means includes a control transistor having an input electrode coupled to the second electrode of said measuring diode, a control electrode, and an output electrode coupled to the input of said time constant circuit means, and biasing means for biasing the control electrode of said control transistor at a predetermined bias level.

9. A drive circuit according to claim 8, wherein said control transistor and said drive transistor are junction diodes having, during operation, collector-emitter voltage drops and base-emitter voltage drops and said measuring diode, during operation, has a diode voltage drop; and said biasing means establishes said predetermined bias level so as to substantially equal the combined levels of the base-emitter voltage drop of control transistor, the diode voltage drop of the measuring diode, and the collector-emitter voltage drop of the drive transistor.

10. A drive circuit according to claim 8, wherein said measuring means further includes a resistor in series with said measuring diode.

11. A drive circuit according to claim 1, wherein said controlling means acts to lengthen said rising time and said falling time in response to increasing load to the motor, and to shorten said rising time and said falling time in response to decreasing load to the motor.

* * * * *